(12) United States Patent
Andaló et al.

(10) Patent No.: US 9,699,476 B2
(45) Date of Patent: Jul. 4, 2017

(54) SYSTEM AND METHOD FOR VIDEO CONTEXT-BASED COMPOSITION AND COMPRESSION FROM NORMALIZED SPATIAL RESOLUTION OBJECTS

(71) Applicant: SAMSUNG ELETRÔNICA DA AMAZÔNIA LTDA., Campinas (BR)

(72) Inventors: Fernanda A. Andaló, Campinas (BR); Otávio A. B. Penatti, Campinas (BR); Vanessa Testoni, Campinas (BR); Fernando Koch, Campinas (BR)

(73) Assignee: SAMSUNG ELETRÔNICA DA AMAZÔNIA LTDA., Campinas (BR)

( * ) Notice: Subject to any disclaimer, the term of this patent is extended or adjusted under 35 U.S.C. 154(b) by 3 days.

(21) Appl. No.: 14/663,637

(22) Filed: Mar. 20, 2015

(65) Prior Publication Data

US 2016/0275354 A1    Sep. 22, 2016

(30) Foreign Application Priority Data

Mar. 17, 2015  (BR) .......................... 1020150059299

(51) Int. Cl.
| | |
|---|---|
| *G06K 9/00* | (2006.01) |
| *H04N 19/59* | (2014.01) |
| *H04N 19/124* | (2014.01) |
| *H04N 19/154* | (2014.01) |
| *H04N 19/17* | (2014.01) |
| *H04N 19/29* | (2014.01) |
| *G06K 9/46* | (2006.01) |

(52) U.S. Cl.
CPC ........... *H04N 19/59* (2014.11); *H04N 19/124* (2014.11); *H04N 19/154* (2014.11); *H04N 19/17* (2014.11); *H04N 19/29* (2014.11); *G06K 9/00228* (2013.01); *G06K 9/4628* (2013.01)

(58) Field of Classification Search
USPC .................................. 382/115–118, 232–253
See application file for complete search history.

(56) References Cited

U.S. PATENT DOCUMENTS

| | | | | |
|---|---|---|---|---|
| 5,500,673 A | * | 3/1996 | Zhou .................. | G06K 9/00228 348/14.01 |
| 6,173,069 B1 | * | 1/2001 | Daly .................. | G06K 9/00228 375/E7.14 |
| 6,526,161 B1 | * | 2/2003 | Yan .................... | G06K 9/00281 348/E13.014 |
| 7,738,015 B2 | * | 6/2010 | Steinberg ........... | G06K 9/00248 348/223.1 |
| 2005/0041121 A1 | * | 2/2005 | Steinberg ........... | G06K 9/00248 348/239 |

(Continued)

*Primary Examiner* — Alex Liew
(74) *Attorney, Agent, or Firm* — Staas & Halsey LLP (57) ABSTRACT

The present invention relates to a system and method for efficiently generating images and videos as an array of objects of interest (e.g., faces and hands, plates, etc.) in a desired resolution to perform vision tasks, such as face recognition, facial expression analysis, detection of hand gestures, among others. The composition of such images and videos takes into account the similarity of objects in the same category to encode them more effectively, providing savings in terms of time transmission and storage. Transmission time is less advantage to such a system in terms of efficiency, while less low cost storage means for storing data.

13 Claims, 2 Drawing Sheets

(56) References Cited

U.S. PATENT DOCUMENTS

| | | | | |
|---|---|---|---|---|
| 2009/0141141 A1* | 6/2009 | Onozawa | ............... | G03B 13/36 |
| | | | | 348/222.1 |
| 2009/0202114 A1* | 8/2009 | Morin | ..................... | A63F 13/12 |
| | | | | 382/118 |
| 2010/0007763 A1* | 1/2010 | Yokohata | ........... | H04N 5/23212 |
| | | | | 348/222.1 |

* cited by examiner

SYSTEM AND METHOD FOR VIDEO CONTEXT-BASED COMPOSITION AND COMPRESSION FROM NORMALIZED SPATIAL RESOLUTION OBJECTS

CROSS-REFERENCE TO RELATED APPLICATIONS

This application claims the benefit of Brazilian Application No. 10 2015 005929 9, filed Mar. 17, 2015, in the Brazilian Intellectual Property Office, the disclosure of which is incorporated herein by reference.

FIELD OF THE INVENTION

The present invention refers to a method and system for generating compressed images and videos containing objects of interest, originally in different resolutions, using a normalized spatial resolution. The method of the present invention can generate efficient images and videos as a grid of objects of interest (e.g., faces and hands, license plates, etc.), in a desired resolution, to perform vision tasks, such as face recognition, face expression analysis, hand gesture detection, among others. The composition of such images and videos takes into consideration the similarity of objects in the same category to encode them more effectively, providing savings in terms of transmission time and storage. Less transmission time represents advantages for such systems in terms of efficiency while less storage means less cost for storing data.

BACKGROUND OF THE INVENTION

Vision-based systems are becoming more popular nowadays, especially because of the increasing power of devices and the new capabilities for information storage. Such systems are often employed to automatically extract and analyze useful information from images and videos.

Considering the high resolution of recent digital cameras and bandwidth limitations, it is very important to develop solutions that can provide possibilities for reducing the amount of data that must be transferred through the network. On top of that, having less data also reduces the impact of storage requirements in any system. Reducing the images spatial resolution is not an option in this scenario because low-resolution images make most computing vision techniques much less precise. For instance, a minimum resolution is required in order to perform visual sentiment analysis in faces images, i.e., to determine face expressions.

Many scenarios have infrastructure limitations, including poor Internet connections/bandwidth and also few space for storing files. But even when there are no concerns about infrastructure and bandwidth limitations, the transmission and storage of entire raw videos is a challenge, possibly making some systems infeasible in practice because of the large amount of data to be transmitted and stored. As an example, considering the school scenario in which the students' faces need to be extracted from images for later identification, it is recommended by current face recognition softwares that each face should be represented by 30 to 40 pixels horizontally. Faces recorded between 5 and 10 meters away from the camera, with video resolution of 1920×1080, are represented in the final frame with 65 to 30 pixels horizontally, i.e., critically close to the lowest resolution required for identification tasks. Therefore, the video resolution of 1920×1080 would be the minimum required and, in this application scenario, a 30 minutes class would need at least 4 GB of storage space. Considering that multiple classes should be recorded daily and simultaneously, this represents a considerable amount of information to be transmitted and stored. Clearly this huge amount of video information generated is not only a problem in the school scenario.

Current solutions do not address the entire process of optimized creation and compression of images/videos depending on the desired context. Tiled streaming and Region-of-Interest (RoI) video encoding are two related solutions. In order to reduce bandwidth, tiled streaming methods can encode a video sequence by dividing its frames into a grid of independent tiles. An image/video can be initially divided in tiles and then scalably encoded and stored. This content can then be streamed with a spatial or quality resolution compatible with the available bandwidth. For instance, a lower resolution version of the sequence can be initially transmitted until a user zooms in and, after that, only the tiles covering the RoI selected by the user can be transferred in higher resolution. The well-known image codec JPEG-XR is an example of a scalable codec that enables tiling. In RoI video encoding methods, foreground-background identification is conducted so that background regions are more compressed at the encoding step, reducing bandwidth consumption.

As most vision-based systems may require high resolution images/videos to work properly, compression only is not acceptable. An interesting alternative to save storage and still keep enough resolution for computing vision tasks is to create images/videos containing only the objects of interest, and then properly encode these images/videos. By initially generating such images/videos, the following encoding step takes advantage of the similarity and proximity of the objects of interest to perform an even more efficient compression. Therefore, there is a double gain, one related to the content generation and another related to the optimized compression.

In the present invention, as will be further detailed, images/videos from objects of interest encoded with normalized spatial resolution and specific quality resolution depending on the context. The normalized spatial resolution is achieved by up-sampling and down-sampling techniques and the different quality resolutions are achieved by appropriate encoding parameters (e.g. different quantization parameters) selected during the compression process. Therefore, the use of the present invention is an interesting solution for compression while keeping enough resolution for vision-based computing systems.

The paper titled: "Region of Interest Encoding in Video Conference Systems", published by C Bulla et al., in: The Fifth International Conferences on Advances in Multimedia (MMedia), 2013, presents a region of interest encoding system for video conference applications. The system is divided into two modules: sender and receiver. The sender comprehends a face detector to detect faces in videos as regions of interest (RoIs), a tracking method to track each RoI across the frames, and a RoI encoding scheme which encodes the RoIs in a good quality and the background in a bad quality. The encoded video stream is transmitted to all receiving clients, or receivers, which can decode it, crop out the regions of interest, and render them. The last rendering step is called "Scene Composition" and it is achieved by showing only the detected people. Each person is scaled and placed side by side at the receiving client. Differently from the paper of C Bulla et al., the present invention does the "scene composition" locally, i.e., it groups the regions of interest in a frame before transmitting the video, which permits savings in data transmission. In the paper of C Bulla et al., the scene composition is done at the receiver, meaning that the complete frames are transmitted over the network. The second difference is that the scene composition in the paper of C Bulla et al. depends on visualization parameters, while the present invention depends on parameters defined by the user influenced by the target application, making it broader. The third difference is related to the target application. In the paper of C Bulla et al., the final video is seen by users and, to this end, the scene composition must be visually pleasant, with spatial alignment, spaces between the faces, etc. In the present invention, the objects of interest can be organized in a square grid, for example, to better explore similarities and consequently obtain better compression. Moreover, the method presented in the paper of C Bulla et al. is applicable only to video conferences. All the details were discussed to achieve better results in this scenario. The system at the paper of C Bulla et al. works only for faces, while the present invention can work with any object of interest. The present invention is much more generic in the sense that it can be applied to several other scenarios.

The patent document US 2013/0107948 A1, titled: "Context Based Encoding and Decoding", published on May 2, 2013, describes a codec that takes into consideration similar regions of interest across frames to produce better predictions than block-based motion estimation and compensation. Similar object instances are associated across frames to form tracks that are related to specific blocks of video data to be encoded. Differently from document US 2013/107948 A1, the present invention does not propose a new codec, but rather presents a data organization scheme that enables current codecs to produce more efficient results.

The patent document WO 2014/025319 A1 titled: "System and Method for Enabling User Control of Live Video Stream(S)", published on Feb. 13, 2014, describes a system that enables multiple users to control live video streams independently, e.g., to request independent zooming of areas of interest. It considers that a current stream is acquired and stored in a number of video segments in different resolutions. Each frame of the video segments is encoded in a virtual tiling technique where each frame of the encoded video segments is divided into an array of tiles, and each tile comprises an array of slices. Upon user request to zoom in a specific area of interest, the tiles corresponding to that area, in an adequate video segment with higher resolution, are transferred to be displayed to the user. The slices outside the area of interest are removed before the display. The present invention differs from the document WO 2014/025319 A1 in many aspects. First, the present invention creates a unique image or video containing only objects of interest represented with a normalized spatial resolution to be transmitted and stored, and not to store several images/videos with different resolutions. In the document WO 2014/025319 A1, the region of interest, i.e., the area that will have higher resolution, is defined in real time by the user and the resolution of that area is also chosen based on the user request. In the method of the present invention, objects of interest can be detected by applying an object detection algorithm depending on the user specification. The creation of the final image/video containing objects with normalized resolution will be done only once and then it will be transmitted and stored. Another difference is the final application. The solution presented on document WO 2014/025319 A1 has a specific application that relates to displaying an area of interest with a specific resolution. The method of the present invention creates a final image/video with objects represented with normalized resolution to be analyzed by a vision-based system. Therefore, it is clear that the method of the present invention has broader application since its parameters are not limited to specific user requests to control video streams.

The paper titled: "Supporting Zoomable Video Streams with Dynamic Region-of-Interest Cropping", published by NQM Khiem et al, in ACM conference on Multimedia systems (MMSys), 2010, presents two methods for streaming an arbitrary region of interest (RoI) from a high resolution video to support zooming and panning: tiled streaming and monolithic streaming. The first method relates the present invention because it divides each frame of a video in a grid of tiles. But differently, the tiles are encoded and stored as an independent stream in their highest resolution. In the present invention, all tiles are represented with the same spatial resolution. In the paper of NQM Khiem et al, a user receives from the server a scaled-down version of a video and requests a zoom in a specific area. The tile streams which overlap with the RoI are sent to the user in a higher resolution. In the approach of the present invention, the final image/video is transmitted to the server to be further stored and analyzed by a vision-based system.

The paper titled: "Adaptive Encoding of Zoomable Video Streams Based on User Access Pattern", published by NQM Khiem, G Ravindra and W T Ooi, in ACM conference on Multimedia systems (MMSys), 2011, presents a method to create zoomable videos, allowing users to selectively zoom and pan into regions of interests within the video for viewing at higher resolutions. The idea is the same as the previous paper of NQM Khiem et al., but instead of dividing each frame into a fixed grid of tiles, user access patterns are taken into consideration. Considering users historical access patterns to regions of a video, the method creates a heat map with the probability of a region to be accessed (zoomed in) by users. The paper of NQM Khiem et al. provides a greedy algorithm to create a tile map so that each tile contains a probable region of interest. Each tile of the high resolution video in the same position, considering all frames, is then encoded in an independent stream. When a user requests a RoI, the overlapping tiles are sent to be displayed with minimum bandwidth because the RoI will probably be entirely inside a tile. The differences to the present invention, besides the ones discussed in the previous paper, are: in the paper of NQM Khiem et al, the tiles are adaptive; the tiles of the present invention are not encoded as different streams; and tiles of the present invention are related to target objects extracted from the input frames.

The paper titled: "Adaptive Resolution Image Acquisition Using Image Mosaicing Technique from Video Sequence", published by S Takeuchi et al, in Proceedings International Conference on Image Processing, 2000, describes a layered image mosaicing method from a video sequence to acquire an adaptive resolution image. The method considers as input a video sequence captured with a camera which zooms in on certain regions where fine textures are present. Each frame is classified in a layer, depending on its zoom level. The images on each layer are then registered to create a unique image. By doing this, the method creates a layered image in which each layer represents an image with a different resolution. Differently, the method of the present invention composes a final image using a grid containing the objects of interest in a desired resolution.

The patent document U.S. Pat. No. 8,184,069 B1, titled: "Systems and Methods for Adaptive Transmission of Data", published on Apr. 22, 2012, describes a system and method for transmitting, receiving, and displaying data. It provides a constant data transmission rate to a device and controls bandwidth by presenting information directed to an area of interest to a user. For example, bandwidth can be lowered by presenting high resolution information directed to an area of interest (e.g., an area to which the user is looking), and lower resolution data directed to other areas. To determine the area of interest the method utilizes a heads-up display used by the user and prioritizes data transmission based on this information. Differently, the present invention does not need any user device to detect areas of interest. Furthermore, the document U.S. Pat. No. 8,184,069 B1 does not enclose any specific method to compose the final frames.

The patent document U.S. Pat. No. 8,665,958 B2 titled "Method and Apparatus for Encoding and Decoding Video Signal Using Motion Compensation Based on Affine Transformation", published on Mar. 4, 2014, presents a video encoding method that can determine whether a block includes an object with an affine transformation. In a positive case, the method generates a prediction block by performing an affine transformation-based motion compensation on the current block, achieving high video encoding/decoding efficiency. The present invention extracts objects from the input frames and creates tiles from them without considering any transformation, just adjusting their resolution. The invention itself of the document U.S. Pat. No. 8,665,958 B2 cannot reach the same outputs obtained by our proposed solution, but it could be applied as an additional/complementary (yet optional) module.

SUMMARY OF THE INVENTION

The invention introduces a method and system to generate images and videos in which objects of interest are encoded in a desired resolution, depending on parameters informed by the user.

The method and system of the present invention are targeted to systems that need to analyze digital images and videos, and extract relevant information from them, while maintaining low bandwidth and data storage.

An embodiment of the invention is composed of a camera that can capture the objects of interest in a scene, and a device with enough processing power to perform the system of the present invention, which comprises four modules to create the final video: object detection, spatial resolution adjustment, frame composition, and video encoding.

The objectives of the invention are achieved by a method for video context-based composition and compression from the normalized spatial resolution object comprising the steps of:

receiving as input data a digital video or image frameset, with the highest possible resolution, and the parameters that inform the categories of target objects and spatial resolution for each category;

detecting and extracting the desired objects in each input video frame, considering the categories reported as parameter;

adjusting the spatial resolution of the extracted objects according to the parameters;

composing final frames, each corresponding to an input video frame, with the extracted and adjusted objects spatially on a grid;

generating a final video by processing all end frames with an encoding algorithm that utilizes the visual similarities and local correlations in the frames (both spatially and temporally at each frame using the frames);

transmitting the final videos and coordinate data corresponding to a vision-based analysis system, where it is stored and analyzed.

Additionally, the preferred embodiment of the invention describes a context based video composition and compression system from the normalized spatial resolution object comprising the steps of:

an object detection module that detects a category of target objects and extracts their coordinate data;

a spatial resolution adjustment module adjusting the sampling of the sensed object to match the informed resolution as a parameter;

a frame composition module that organizes the detected objects of each incoming frame in a grid to create a final frame; and a video coding module that encodes the final video using spatial and temporal correlations of similar objects in similar position in the later subsequent frames.

The system receives as input a digital video or image with the highest possible resolution, and parameters that inform the categories of target objects and a spatial resolution for each category. Based on these input data, the system performs for each informed category: (i) detecting and extracting, for each input frame, the desired objects related to the considered category; (ii) adjusting the spatial resolution of the extracted objects according to the parameters; (iii) for each input frame, composing a corresponding final frame with the extracted and adjusted objects grouped spatially in a grid; (iv) generates a final input video by processing the final frames with an encoding algorithm which could benefit from the visual similarities and local correlations in the frames (both spatially in each frame and temporally across several frames). The visual similarities considerably improve the effectiveness of the encoding algorithm, consequently increasing the compression capacity.

BRIEF DESCRIPTION OF THE FIGURES

The objectives and advantages of the present invention will become more clear by means of the following detailed description of a preferred but non-limitative embodiment of the invention, in view of its appended figures, wherein.

DETAILED DESCRIPTION OF THE INVENTION

Scenario and Application of the Present Invention

Figure 1:
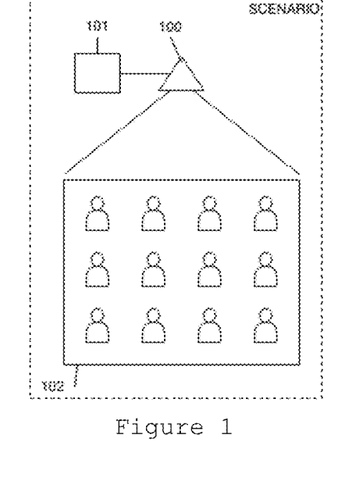
FIG. 1 describes a scenario in which an embodiment of the present invention is applied.

FIG. 1 describes a scenario in which the present solution could be applied. The scenario is composed of at least one camera 100 that can take pictures/video of the complete desired scene 102, depicting the necessary objects. The method of the present invention may run on the camera 100 or any external device 101 with processing power attached to the camera 100. The scene 102 can be a classroom with students, a parking lot with cars, a public place (e.g., airport, stadium), or any related scene where it is necessary to analyze one or more categories of objects, such as face, hand, license plate, car, etc.

Inputs to the Proposed System

Figure 2:
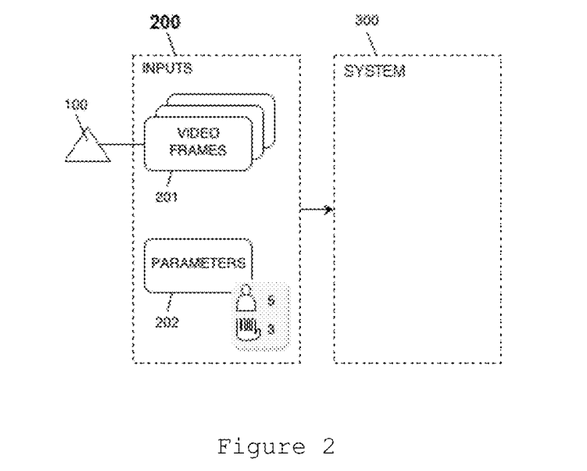
FIG. 2 shows the inputs to the system implementing on embodiment of the method of the present invention.

FIG. 2 illustrates the data input 200 required by the embodiment of the method of present invention, which is composed of video frames 201 and parameters 202. The video frames 201 are those acquired by the camera 100 with the highest available resolution, preferably in RAW format, in which the data coming from the camera's sensor is minimally processed. The parameters 202 are specified by the system user and represents the requirements of the final vision task, which comprises: (i) one or more categories of target objects to be detected in the input frames, by providing either pre-defined names, such as "face" and "hand"; by providing a template image of the target objects; or by providing specific coordinates of fixed target objects; (ii) a spatial resolution, in pixels, for each category. For example, considering squares multiples of 16 pixels, parameters "face/5; hand/3" means that "faces" will be detected and represented with 80×80 pixels (5×16=80), and "hands" will be detected and represented with 48×48 pixels (3×16=48).

Overview of the System

Figure 3:
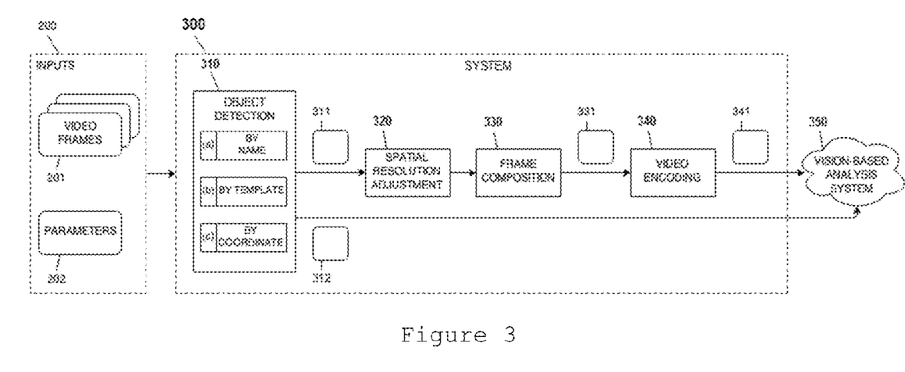
FIG. 3 represents an overview of the system implementing on embodiment of the method of the present invention.

FIG. 3 illustrates the overview of the exemplar system 300 according to an embodiment of the present invention. The purpose of the system 300 is to compose and encode one video for each category of target objects informed as parameter 202 of data input 200, in order to be transmitted to any vision-based analysis system 350. For each input video frame 201, the system 300 creates a final frame 331 with a grid of objects in the desired resolution, according to the parameters 202 informed by the user, and all these final frames 331 are used to generate a final encoded video sequence 341.

Thus, the exemplar system 300 comprises four modules: object detection 310, spatial resolution adjustment 320, frame composition 330, and video encoding 340.

For each input video frame 201, the object detection module 310 detects the first category of target objects 311 and extracts their coordinate data 312. The spatial resolution adjustment module 320 performs up or down sampling of each detected object 311 to match the desired resolution informed as parameter 202. The frame composition module 330 organizes the detected objects 311 of each input frame 201 in a grid to create a final frame 331. The final module, i.e. video encoding 340, encodes the final video 341 by applying a codec that takes advantage of the spatial and temporal correlations of similar objects in similar positions in subsequent final frames 331. The whole process is repeated to create a final video 341—composed of a plurality of final frames 331—for each category of target objects. The final videos 341 and the corresponding coordinate data 312 are efficiently transmitted (e.g., through the Internet) to a vision-based analysis system 350, where they are stored and analyzed. The vision-based system 350 can be related to a variety of scenarios: analysis of facial expression in students during a class; search for stolen cars in a parking lot (or streets) by their license plates; visual analysis of plagues in fruit/vegetable plantations; visual analysis of the performance of athletes in the field; targeted visual analysis of dangerous areas in surveillance cameras, face recognition in public places, etc.

Still referring to FIG. 3, each module of the system 300 will be described in more detail bellow.

Object Detection Module

The object detection module 310 receives as input 200 the video frames 201 and parameters 202 specifying the categories of the target objects and a target resolution for each category. Each category can be informed in three distinct ways: (a) the system is previously trained to detect some categories of objects and, in this case, only the name of the category needs to be informed; (b) the user can provide a template image of the object to be detected; (c) the user can provide image coordinates of fixed objects.

In the first case (a), the system needs to be trained to detect some categories of objects. One possible solution is to use OverFeat, a convolutional network-based object recognizer (Sermanet et al. "OverFeat: Integrated Recognition, Localization and Detection using Convolutional Networks" in International Conference on Learning Representations, ICLR 2004, also available on line at arXiv preprint 1312.622v4).

In case the user provides template images (b), there are several image descriptors that can be used to describe, detect and match local features that represent the target object. The most popular descriptor is SIFT, published by David G. Lowe, titled: "Object Recognition from local scale-invariant features", in IEEE International Conference on Computer Vision, 1999. However, other descriptors can be considered, such as SURF, published by Herbert Bay et al., titled: "SURF: Speeded Up Robust Features", in European Conference on Computer Vision, 2006. In case the user provides the image coordinates of the target objects (c), the object detection is direct and immediate, since module (310) will delimitate the objects according to the informed specific coordinates.

This module 310 outputs two different pieces of information: the detected target objects 311 as different image tiles and their image coordinates 312. For each input video frame 201, this module 310 detects and extracts the target objects 311 as described above. The coordinates 312 can be the top left and bottom right pixels of the rectangle ("bounding box") that encloses the detected object in the original input video frame 201. Besides "bounding box", the object detection can be achieved by different manners, such as the set of coordinates of all pixels which delimitates the object. The object detection module can also take advantage of a tracking procedure, which could track detected objects across frames. If the same object is often positioned in the same place of the final grid (after frame composition module), there is a chance to obtain even higher compression rates in the final video.

Spatial Resolution Adjustment Module

The spatial resolution adjustment module 320 processes the objects 311 detected in the previous module 310 so that they are represented in the target spatial resolution informed by the user parameters 202. If the object's current resolution is lower than the desired resolution, an up-sampling process is performed. Otherwise, a down-sampling process is performed.

The down-sampling operation is simpler than the up-sampling and can be performed in several ways. Considering each detected object as a different image tile, one can simply drop each other tile column and/or row. If several columns and/or rows must be dropped in order to achieve the final desired spatial resolution, smoothing processes can be applied to reduce the discontinuities that can be generated in a tile full of details, for instance. A possibility, in this case, would be to compute the mean of the consecutive columns that must be dropped and then replace the remaining column by the mean column.

On the other hand, the up-sampling operation is more complex because it must preserve the sharpness and the tile structure while creating new columns/rows in order to increase the spatial resolution. This process is often referred to as magnification. The traditional magnification approaches are based on bilinear, bicubic or spline interpolation. These methods are fast, but usually generate blurred images. To avoid this problem, interpolation methods that try to preserve the image characteristics, such as the directionality, can be applied (Vladan Velisavljecic et al., titled: "Image Interpolation with Directionlets", in IEEE International Conference on Acoustics, Speech, and Signal Processing, 2008; Hao Jiang et al., titled: "A new direction adaptive scheme for image interpolation", in IEEE International Conference on Image Processing, 2002; Sadik Bayrakeri et al. tiled: "A new method for directional image interpolation", in IEEE International Conference on Acoustics, Speech, and Signal Processing, 1995). Other possibility for up-sampling is to use methods based on super resolution (Freeman et al., titled: "Example-based super-resolution". in IEEE Computer Graphics and Applications, 2002).

Frame Composition Module

The frame composition module 330 composes the final frames 331. For each input video frame 201, the tiles with the detected objects (already spatially adjusted by the previous module) are organized in a grid. One possibility to determine the grid configuration (width and height) is to consider the information of the maximum number of objects that could be detected in the video. For example, in a classroom, one may know beforehand the maximum number of students. For better compression, the grid should be as square as possible, e.g., square root of the number of detected objects in the frame. However, depending on the video encoding algorithm to be used, the grid can have different forms, like a single row or a single column, for instance.

Video Encoding Module

The video encoding module 340 initially joins all the previously generated frames in a raw video sequence and then applies a standard video codec—such as H.264/AVC or HEVC—in order to generate a final encoded video sequence (341—plurality of final frames 331) ready to be stored and/or transmitted and/or analyzed by vision-based systems 350. There are several advantages in the application of such video codecs to the raw video sequences. All the frames previously generated have objects from the same category and due to the spatial prediction techniques included in the mentioned video codecs, all this spatial correlation is reduced. Besides, since the different frames have similar objects in similar positions, the inherent temporal correlation is also reduced due to the motion estimation and motion compensation techniques which are part of the mentioned video codecs. Finally, each tile corresponding to each object 311 inside of each frame 331 can be encoded with a different quality resolution. For instance, a tile with an initial high spatial resolution before going through the "Spatial Resolution Adjustment module" 320 has a lot of information and can be more compressed than another tile with an initial low spatial resolution which cannot afford missing even more information during the encoding process. The process of applying a high compression level to one tile means encoding this tile with a high quantization parameter (QP), while applying a low compression level means compressing this tile with a low QP. Both mentioned video codecs—H.264/AVC and HEVC—allow the encoding of each tile with a different QP, meaning that the final compressed frame 331 is composed by tiles encoded with different quality resolutions and that the overall frame compression process is optimized.

The final video 341, together with the corresponding coordinate data 312 generated by module 310, are efficiently transmitted to a vision-based analysis system 350, where they are stored and analyzed.

Embodiment of the Method of the Present Invention

Figure 4:
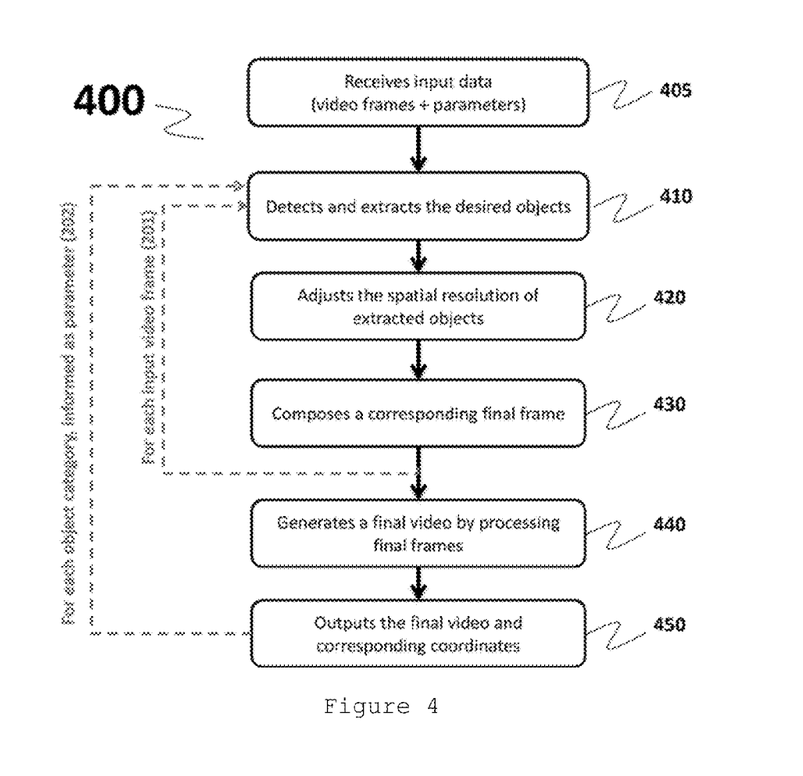
FIG. 4 represents the flowchart of an embodiment of the method of the present invention (invention's operation), implemented by the system.

As described above, the main purpose of the system 300 is to implement the method 400, which corresponds to the generic invention's operation. According to FIG. 4, the method 400 comprises the following steps:

receiving 405 as input data 200 a digital video or image frames 201 with the highest possible resolution, and parameters 202 that inform the categories of target objects and a spatial resolution for each category;

for each object category, informed as parameters 202 and for each input video frame 201:

detecting and extracting 410 the desired objects 311, considering the informed categories [This step 410 is implemented by the module 310 of the system 300];

adjusting 420 the spatial resolution of the extracted objects 311 according to the parameters 202 [This step 420 is implemented by the module 320 of the system 300];

composing 430 a corresponding final frame 331 with the extracted and adjusted objects 311 grouped spatially in a grid [This step 430 is implemented by the module 330 of the system 300];

generating 440 a final video 341 by processing all the final frames 331 with an encoding algorithm which could benefit from the visual similarities and local correlations in the frames (both spatially in each frame and temporally across several frames). The visual similarities considerably improve the effectiveness of the encoding algorithm, consequently increasing the compression capacity [This step 440 is implemented by the module 340 of the system 300];

efficiently transmitting 450 the final videos 341 and the corresponding coordinate data 312 to a vision-based analysis system 350, where they are stored and analyzed [This step 450 corresponds to the interface between the system 300 and the external vision-based system 350].

Although the present invention has been described in connection with certain preferred embodiments, it should be understood that it is not intended to limit the invention to those particular embodiments. Rather, it is intended to cover all alternatives, modifications and equivalents possible within the spirit and scope of the invention as defined by the appended claims.

What is claimed is:

1. An apparatus for video context-based composing and compression from normalized spatial resolution objects, the apparatus comprising:
   at least one processor comprising:
      a data input module to receive a category of an object and a spatial resolution parameter input by a system user;
      an object detection module that detects objects of the category input by the system user and extracts coordinate data of the detected objects;
      a spatial resolution adjustment module that adjusts the detected objects to match the spatial resolution parameter input by the system user;
      a frame composition module that organizes the detected objects of each input frame in a grid to create an output frame; and
      a video coding module that encodes the set of output frames in a final video using spatial and temporal correlations of similar objects in a similar position in subsequent output frames;
   wherein the final video and the coordinate data are transmittable to a vision-based analysis system to be stored and analyzed.

2. The apparatus of claim 1, wherein the input includes a digital video or a set of image frame.

3. The apparatus of claim 2, wherein
   the set of digital video frames is obtained by a camera; and the parameter represents a requirement of the vision-based analysis system, comprising:
one or more types of target objects to be detected in the input frame, providing predefined names; or providing a model image of the target object; or providing specific fixed coordinates of target objects; and
a spatial resolution in pixels for the category.

4. The apparatus of claim 1, wherein the object detection module receives as input the video frames and parameters specifying the categories of the target objects and a target spatial resolution for each category, and for each video frame, this module detects and extracts the target objects and their corresponding image coordinates.

5. The apparatus of claim 4, wherein the detection and extraction of the target object is implemented by one or more object recognizer based on a convolutional network, various image descriptors, and delimitation of the target object according to specific coordinates.

6. The apparatus of claim 1, wherein
the spatial resolution adjustment module processes the detected objects so that the objects are represented in a spatial resolution target specified by the parameter; and
if a current resolution of the object is less than the resolution specified by the parameter, an up sampling process is performed; otherwise, a down sampling process is performed.

7. The apparatus of claim 1, wherein the frame composition module arranges image tiles with the spatially adjusted detected objects in a grid that corresponds to the output frame, considering a maximum number of objects that can be detected in the video.

8. The apparatus of claim 1, wherein the video coding module joins all frames previously generated in a raw video sequence, and applies a standard video codec, in order to generate a final coded video sequence ready to be stored and/or transmitted and/or analyzed by the vision-based analysis system.

9. An apparatus for video context-based composing and compression from normalized spatial resolution objects, the apparatus comprising:
at least one processor comprising:
an object detection module that detects objects of the category specified as input and extracts coordinate data of the detected target object;
a spatial resolution adjustment module that adjusts the detected objects to match the resolution parameter specified by a system user;
a frame composition module that organizes the detected objects of each input frame in a grid to create an output frame; and
a video coding module that encodes the set of output frames in a final video using spatial and temporal correlations of similar objects in a similar position in subsequent output frames;
wherein the final video and the coordinate data are transmittable to a vision-based analysis system to be stored and analyzed,
wherein the video coding module joins all frames previously generated in a raw video sequence, and applies a standard video codec, in order to generate a final coded video sequence ready to be stored and/or transmitted and/or analyzed by the vision-based analysis system, and
wherein each image tile corresponding to each object within each frame can be encoded with a different quality, by applying different quantization parameters, resulting in a final compressed frame comprising tiles with different qualities, optimizing the video compression procedure.

10. The apparatus of claim 9, wherein the video codec is H.264/AVC or HEVC.

11. A method for video context-based composing and compression from normalized spatial resolution objects, the method comprising:
receiving, using a data input module, as input data a digital video or a set of image frames and parameters, specified by a system user, for a category of a target object and a spatial resolution for the category;
detecting and extracting the target objects from the input video, based on the category and the parameter;
adjusting the spatial resolution of the extracted objects according to the parameter;
composing a final frame with the extracted and adjusted objects spatially grouped in a grid;
generating a final video by processing all output frames with an encoding algorithm that utilizes visual similarities and location correlations in a frame;
preparing the final video and coordinate data for transmission to a vision-based analysis system for storage and analysis.

12. The method of claim 11, wherein the parameter includes at least one of a predefined category name, a model image, and specific fixed coordinates of target objects.

13. The method of claim 11, wherein
the detecting and extracting the target object is performed by an object detection module;
the adjusting the spatial resolution of the extracted object is performed by a spatial resolution adjustment module;
the composing the final frame is performed by a frame composition module; and
the generating the final video is performed by a video encoding module.

* * * * *

UNITED STATES PATENT AND TRADEMARK OFFICE
CERTIFICATE OF CORRECTION

PATENT NO. : 9,699,476 B2
APPLICATION NO. : 14/663637
DATED : July 4, 2017
INVENTOR(S) : Fernanda A. Andaló et al.

Page 1 of 1

It is certified that error appears in the above-identified patent and that said Letters Patent is hereby corrected as shown below:

In the Claims

Column 10, Line 64:
In Claim 2, delete "frame." and insert -- frames. --, therefore.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*